(12) United States Patent
Kamay et al.

(10) Patent No.: US 8,443,219 B2
(45) Date of Patent: *May 14, 2013

(54) MECHANISM FOR REDUCING THE POWER CONSUMPTION OF VIRTUAL DESKTOP SERVERS

(75) Inventors: Yaniv Kamay, Modi' (IL); Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 482 days.

This patent is subject to a terminal disclaimer.

(21) Appl. No.: 12/551,460

(22) Filed: Aug. 31, 2009

(65) Prior Publication Data

US 2011/0055830 A1 Mar. 3, 2011

(51) Int. Cl.
*G06F 1/26* (2006.01)
*G06F 1/32* (2006.01)

(52) U.S. Cl.
USPC ............ 713/320; 713/310; 713/323; 713/324

(58) Field of Classification Search .................. 713/310, 713/320, 323, 324
See application file for complete search history.

(56) References Cited

U.S. PATENT DOCUMENTS

| | | | |
|---|---|---|---|
| 7,137,016 B2 | 11/2006 | Nalawadi et al. | |
| 7,543,166 B2 * | 6/2009 | Zimmer et al. | 713/310 |
| 7,739,527 B2 | 6/2010 | Rothman et al. | |
| 2002/0099753 A1 | 7/2002 | Hardin et al. | |
| 2005/0268078 A1 | 12/2005 | Zimmer et al. | |
| 2007/0130305 A1 * | 6/2007 | Piper et al. | 709/223 |
| 2009/0293056 A1 * | 11/2009 | Ferris | 718/1 |
| 2009/0300381 A1 * | 12/2009 | Chen et al. | 713/310 |
| 2010/0115315 A1 * | 5/2010 | Davis et al. | 713/323 |
| 2010/0192149 A1 * | 7/2010 | Lathrop et al. | 718/1 |
| 2010/0199062 A1 * | 8/2010 | Sancho-Dominguez et al. | 711/202 |
| 2010/0218014 A1 * | 8/2010 | Bozek et al. | 713/320 |
| 2010/0218183 A1 * | 8/2010 | Wang et al. | 718/1 |
| 2010/0306560 A1 * | 12/2010 | Bozek et al. | 713/320 |
| 2010/0325197 A1 | 12/2010 | Heim | |
| 2011/0055602 A1 * | 3/2011 | Kamay et al. | 713/320 |
| 2011/0191610 A1 | 8/2011 | Agarwal et al. | |

OTHER PUBLICATIONS

Qumranet, Solid ICE™, Connection Broker, Apr. 2008, 7 pages.
Qumranet, KVM—Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.
USPTO, Office Action for U.S. Appl. No. 12/551,479, mailed Nov. 8, 2011.
USPTO, Final Office Action for U.S. Appl. No. 12/551,479, mailed Apr. 4, 2012.
USPTO, Advisory Action for U.S. Appl. No. 12/551,479 mailed Jun. 13, 2012.

* cited by examiner

*Primary Examiner* — Vincent Tran
(74) *Attorney, Agent, or Firm* — Lowenstein Sandler LLP

(57) ABSTRACT

A mechanism for reducing the power consumption of virtual machine host servers is disclosed. A method for a virtual machine (VM) power reduction agent (PRA) hosted by a VM may include identifying a user activity associated with the VM, determining that the VM is inactive based on the user activity associated with the VM, and notifying a host of the VM that the VM is inactive to facilitate application of a power reduction policy to the VM based on specific power reduction settings associated with the VM.

20 Claims, 5 Drawing Sheets

MECHANISM FOR REDUCING THE POWER CONSUMPTION OF VIRTUAL DESKTOP SERVERS

TECHNICAL FIELD

The embodiments of the invention relate generally to virtual machines and, more specifically, relate to a mechanism for reducing the power consumption of servers hosting virtual machines.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine manager (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Recently, solutions providing centralized hosting for VMs that run (virtual) desktops have been developed. Such solutions consist of centralized servers that are partitioned into multiple VMs that host the virtual desktops, thereby providing a desktop for each user. The centralized hosting provides the manageability of sever-based computing, while the dedicated environment provides the flexibility and compatibility with applications that a desktop enables. In general, VMs therefore enable remote access to a host or server computer by a remote client computer, which mimics or reconstructs the events taking place on the host computer.

However, one problem that arises with the centralized hosting solution for VMs is excessive power consumption. Currently, centralized data centers attempt to save power in a non-virtual environment by using several power management mechanisms and policies to reduce power. For example, a data center may selectively switch off computing machines, or part of the computing machines, so that the data center is consuming less power overall. Some examples of existing power management mechanisms and/or policies include shutting off an operating system (OS), placing the OS in a low power consumption mode, placing the OS in a hibernation mode, placing the OS in a suspend mode, selectively shutting down a system display, system networking component, reducing a frequency of an operating CPU, and so on.

However, with a virtualized system, these currently-existing power management mechanisms and policies are not effective in the VM hosting environment. The current power management mechanisms and policies cannot be used because, from the host view, each VM is an application that is always working. It becomes practically impossible to use any prior art power management method to reduce power, as the host needs computing power for the working VMs. Therefore, a power consumption reduction method for virtual desktop servers would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
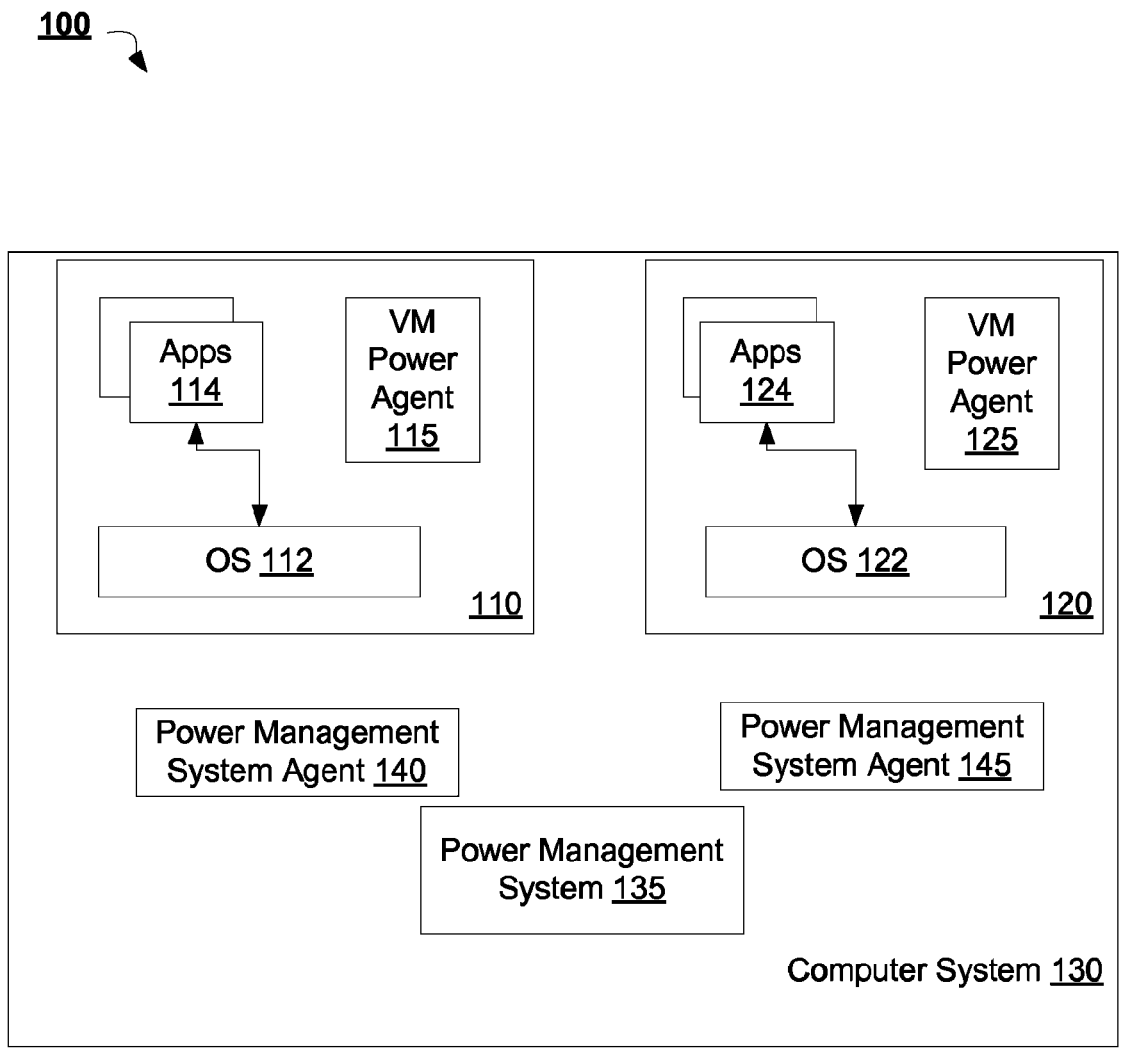
FIG. 1 is a block diagram of a virtualization system that can implement power consumption reduction policies according to one embodiment of the invention.

Embodiments of the invention provide for a mechanism to reduce the power consumption of virtual machine (VM) servers. In one embodiment, a method of reducing the power consumption of VM servers with a VM power reduction agent (PRA) hosted by a VM includes identifying a user activity associated with the VM, determining that the VM is inactive based on the user activity associated with the VM, and notifying a host of the VM that the VM is inactive to facilitate application of a power reduction policy to the VM based on specific power reduction settings associated with the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism to reduce power consumption of servers hosting virtual machines (VM servers). Embodiments of the invention reduce power consumption in VM servers by utilizing an internal power reduction mechanism in a guest operating system (OS) within a VM, called a paravirtualized power reduction agent (or VM power reduction agent), to react to inactivity by a user of the VM. When inactivity by a user in a particular VM is detected, the VM power reduction agent signals a management system of the VM that the VM is inactive so that the management system may apply one or more power reduction policies. Embodiments of the VM power reduction agent solve three problems: (1) reducing power consumption of a VM server, (2) protecting a display of a VM client; and (3) reducing power consumption of a remote VM client.

FIG. 1 is a block diagram of a virtualization computer system 130 that provides power consumption reduction according to embodiments of the invention. As shown in FIG. 1, the computer system 130 hosts two VMs 110 and 120 that respectively run guest OS 112 and 122. Guest OS 112 executes applications 114 and guest OS 122 runs applications 124.

The guest OSes 112, 122 and the associated VMs are controlled by a software layer that runs directly on a hardware platform of the computer system 110 and virtualizes the hardware platform's physical resources. This software layer may be referred to as a virtual machine monitor (VMM), a hypervisor, a host OS or a kernel-based virtual machine (KVM). A guest OS may be of the same or different type with respect to the host OS. For example, a guest OS may be a Windows operating system from Microsoft and a host OS may be a Linux operating system available from Red Hat. In addition, the guest OSes 112 and 122 can be of the same or different types.

The hardware platform of the computer system 130 may include a central processing unit (CPU), a system memory, a storage disk, a network interface card (NIC), a display adapter, and so on. The interface exported to the VMs 110 and 120 is the same as the interface of each of the hardware's resources would appear in a physical desktop computer.

In some embodiments, VMs 110 and 120 may also each include a VM power reduction agent (VM PRA) 115 and 125, respectively. In addition, VMs 110 and 120 may each be associated with a power management system agent 140 and 145, respectively. VM PRA 115, 125 identifies inactivity in its corresponding VM 110, 120 and signals a relevant management system agent 140, 145, which then communicates with a global power management system 135. The power management system 135 and the agents 140, 145 may run on top of the VMM, or be part of the VMM or a hardware emulation layer. VM PRAs 115, 125 assist the power management system 135 in implementing power reduction policies for the VM 110, 120 respectively. In this way, the monitoring of activity, and therefore power consumption, of each VM 110, 120 is performed by the VM itself. Examples of power reduction policies include running a screensaver, reducing priority, swapping VMs, hibernation, suspension, standby, shut off, and so on. One skilled in the art will appreciate that there are a wide variety of possible power reduction policies possible to implement in embodiments of the invention.

Embodiments of the invention allow a user of the VM to maintain control over the settings for the VM PRA 115, 125. For instance, a user of the VM 110, 120 is able to set time limits for the power consumption policies, such as a time limit for a screensaver to appear, for the system to go into standby, hibernate, or shutoff, and so on.

Power management system 135 is notified by the VM PRA 115, 125 via the power management system agent 140, 145 of inactive VMs and applies a power reduction policy to the inactive VMs 110, 120. The power reduction policy to be applied to the VM 110, 120 is based on power reduction settings associated with the VM. The power reduction settings may be modified by an end user of the VM. In some embodiments, the power reduction settings are standard default settings applied by the VM PRA 115, 125 upon initialization of the VM 110, 120. The power reduction settings may be stored by the VM PRA 115, 125 or by the power management system 135.

In another embodiment, an Advanced Configuration and Power Interface (ACPI) mechanism may be utilized to trigger implementation of power reduction policies by the VM PRA 115, 125 to individual VMs 110, 120. The ACPI mechanism is a mechanism that is used to signal when power management is necessary. It is part of the BIOS of the OS system. For example, in order to hibernate a system, the OS triggers an ACPI function to switch the system to the hibernation state. Embodiments of the invention may catch an ACPI event triggered by the guest OS 112, 122 to implement a power reduction policy for the VM. The ACPI mechanism is emulated as part of the VM engine, so that each individual VM is capable of throwing an ACPI event.

In some embodiments, VM PRAs 115, 125 are implemented as standard screen-saver modules. Alternatively, VM PRAs 115, 125 may provide other functionality in addition to, or instead of, the functionality provided by a standard screen-saver modules.

Figure 2:
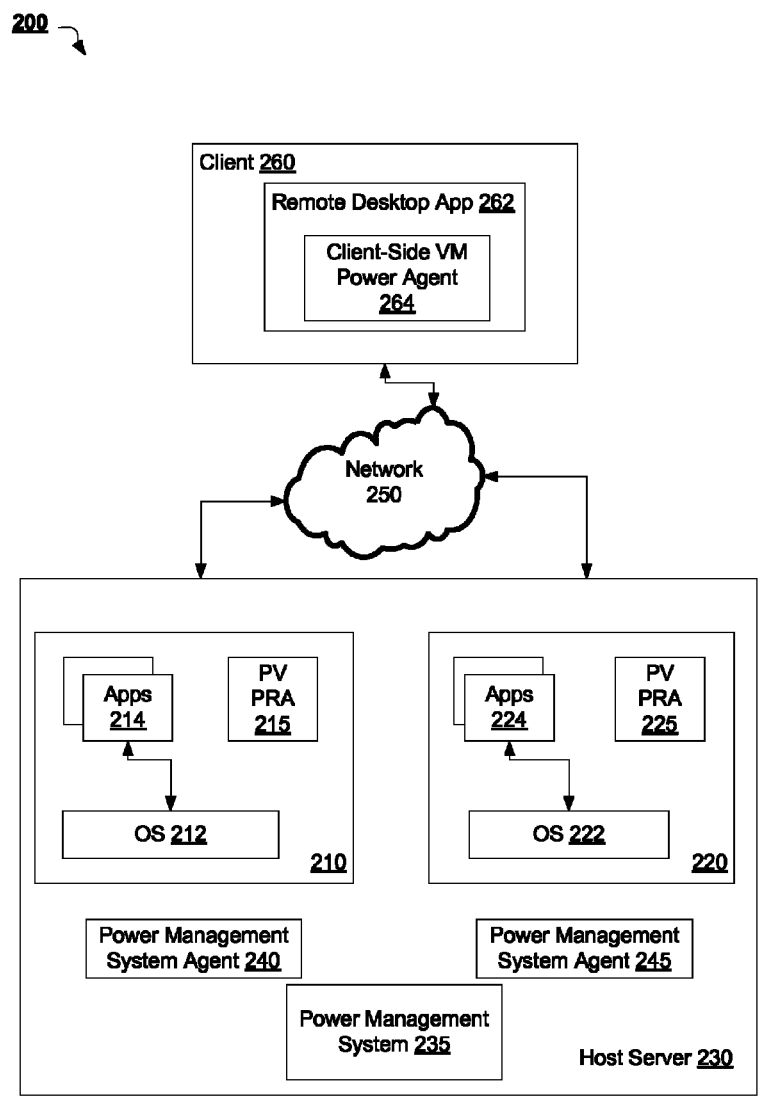
FIG. 2 is a block diagram of a virtualization system that can implement power consumption reduction policies according to another embodiment of the invention.

FIG. 2 is a block diagram illustrating a more detailed view of a virtualization system 200 that reduces the power consumption of a virtual machine server according to embodiments of the invention. The virtualization system 200 includes one or more clients 260 coupled to a host server 230 via a network 250. Network 250 may be a local area network (LAN) or a wide area network (WAN) and may be a combination of one or more networks. The server 230 hosts VMs 210 and 220 that respectively run guest OS 212 and guest OS 222. Guest OS 212 executes applications 214 and guest OS 222 runs applications 224. The guest OSes 212, 222 and the associated VMs are controlled by a software layer that runs directly on a hardware platform of the server 230 and virtualizes the hardware platform's physical resources. This software layer may be referred to as a VMM, a hypervisor, a host OS or a KVM.

In one embodiment, each virtual machine 210, 220 hosts or maintains a desktop environment providing virtual desktops for remote clients including client 260. In some embodiments, client 260 may be a thin client with sufficient resources to enable a user to interact with a virtual desktop provided by VM 210, 220. A virtual desktop can represent an output (e.g., an image to be displayed) generated by a desktop application running within virtual machine 210 or 220. Graphics data associated with the virtual desktop can be captured and transmitted to a client such as client 260, where the virtual desktop may be rendered by a rendering agent and presented by a client application.

In some embodiments, client 260 includes a remote desktop application 262 to provide a remote connection protocol built for virtual environments that enables the user to view and interact with VMs 210, 220 via a remote computing system. Remote desktop application 262 may also include a client-side power management agent 264 that cooperates with host-side VM PRA 215, 225 and/or power management system agent 240, 245. It should be noted, however, that the presence of the power management agent 265 on the client is not necessary for the embodiments of the present invention. In addition, the client-side power management agent 265 can be part of a different module or be an independent module executing on client 260.

The client-side power management agent 264 may assist the host-side VM PRA 215, 225 in the host-side VM PRA's 215, 225 responsibilities, such as gathering user activity associated with a VM 210, 220, and running a screensaver on the client 260 associated with a power reduction policy for a VM 210, 220. In some embodiments, the client-side power management agent 264 can understand and identify events that trigger implementation of power reduction policies.

In some embodiments, the client-side power management agent 264 may be utilized along with the host-side VM PRAs 215, 225 to activate local policies on the client device. In one example embodiment, instead of the host-side VM PRA 215, 225 running a graphics-intensive and high-power-consuming screensaver for the VM 210, 220 as a power reduction policy, the power management system agent 240, 245 may signal the client-side power management agent 264 to run a screensaver on its end. In other embodiments, the host-side VM PRA 215, 225 communicates with the power management system agent 240, 245 to signal the client-side power management agent 264 to run the screensaver while the power management system 235 implements a power reduction policy for the VM (which is not necessarily a screensaver). In this way, the VM 210, 220 is saved from utilizing more power than necessary to run a screensaver and can offload this graphics-intensive task to the client system 260. In addition, one or more displays of client 260 are protected from damage down by an idle VM with a static image being displayed. It is envisioned that various power reduction policies other than a screensaver may also be handled by the client-side power management agent 264 in lieu of the host-side VM PRA agent 215, 225 in some embodiments of the invention.

In one embodiment, an ACPI mechanism is used at the client 260 to switch the client physical machine to a power saving mode. The client 260 may then be switched out from the power saving mode using a mechanism such as "wake-on-LAN" (e.g., waking the client up via a special packet received on the LAN).

In some embodiments, client 260 may include multiple display monitors, each associated with a particular VM 210, 220. In such a case, the host-side VM PRA 215, 225 or client-side power management agent 264 can differentiate between the displays and associated VMs and only control the display that the inactive VM 210, 220 is currently associated with. If there is more than one VM 210, 220 associated with a display, then the host-side VM PRA 215, 225 or client-side power management agent 264 may communicate with the power management system agent 240, 245 to notify the power management system 264 to implement power reduction policies to the entire monitor in the case where all of the VMs 210, 220 associated with the display are inactive.

Figure 3:
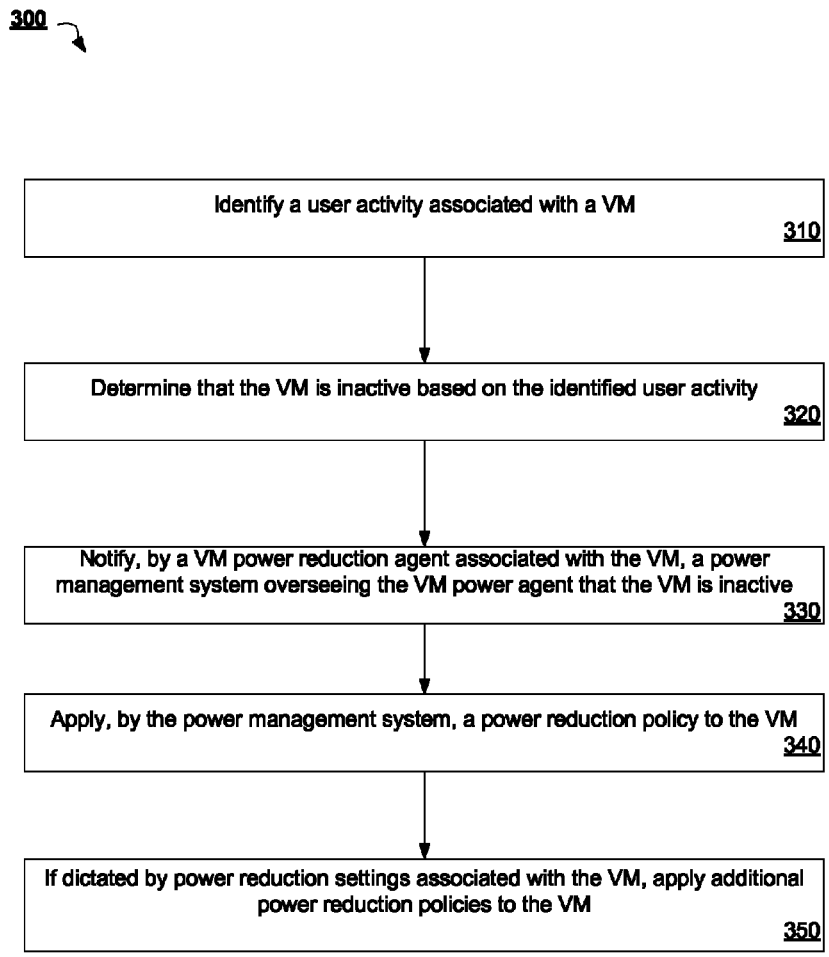
FIG. 3 is a flow diagram illustrating a method for reducing the power consumption of virtual machine servers according to an embodiment of the invention.

FIG. 3 is a flow diagram illustrating a method 300 for reducing the power consumption of VM servers (e.g., virtual desktop servers) according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by virtualization system 100 of FIG. 1. In another embodiment, method 300 may be performed by virtualization system 200 of FIG. 2.

Method 300 begins at block 310 where a user activity associated with a VM is identified. In some cases, the user activity may consist of mouse and keyboard activity associated with a user of the VM. In one embodiment, a guest-side VM PRA monitors and identifies the user activity associated with the VM.

Then, at block 320, it is determined that the VM is inactive based on the monitored user activity. In one embodiment, the guest-side VM PRA determines that the VM is inactive based on the user activity.

At block 330, the VM PRA notifies the power management system overseeing the VM power agent that the VM is inactive. Then, at block 340, a power reduction policy is applied to the VM by the power management system. As discussed above, the power reduction policy may consist of one or more of a variety of power-saving policies, including, for example, running a screensaver, reducing priority of a VM, swapping the VM with another VM, hibernation, suspension, standby, and shut off. Other power-saving policies may also be implemented and embodiments of the invention are not solely limited to the above-mentioned policies.

The power reduction policy may be applied based on individual power reduction settings associated with the VM. In one embodiment, the individual power reduction settings associated with the VM are provided by an end user of the VM. For example, the end user may provide power reduction settings such that a screensaver will be implemented for the VM after 10 minutes of user inactivity, and/or that the VM will go into a standby condition after 15 minutes of user inactivity.

In one embodiment, these individual power reduction settings may be default settings which the VM PRA abides by upon initialization of the VM and its VM PRA. The end user may modify these power reduction settings via a user interface provided by the VM PRA. In one embodiment, the interface may be provided to the end user for any modifications upon initialization of the VM. Alternatively, the user interface may be provided by the power management system overseeing the VM power agent. Similarly, the power management system may also maintain the default power reduction settings for each VM PRA.

At block 350, additional power reduction policies may be applied to the VM in addition to the initially applied power reduction policy, if the power reduction settings of the VM PRA dictate such additional power reduction policies. For example, a screensaver may be initially applied to an inactive VM, and then after a preset period of time passes, a standby condition may be applied to the VM in lieu of the screensaver.

Figure 4:
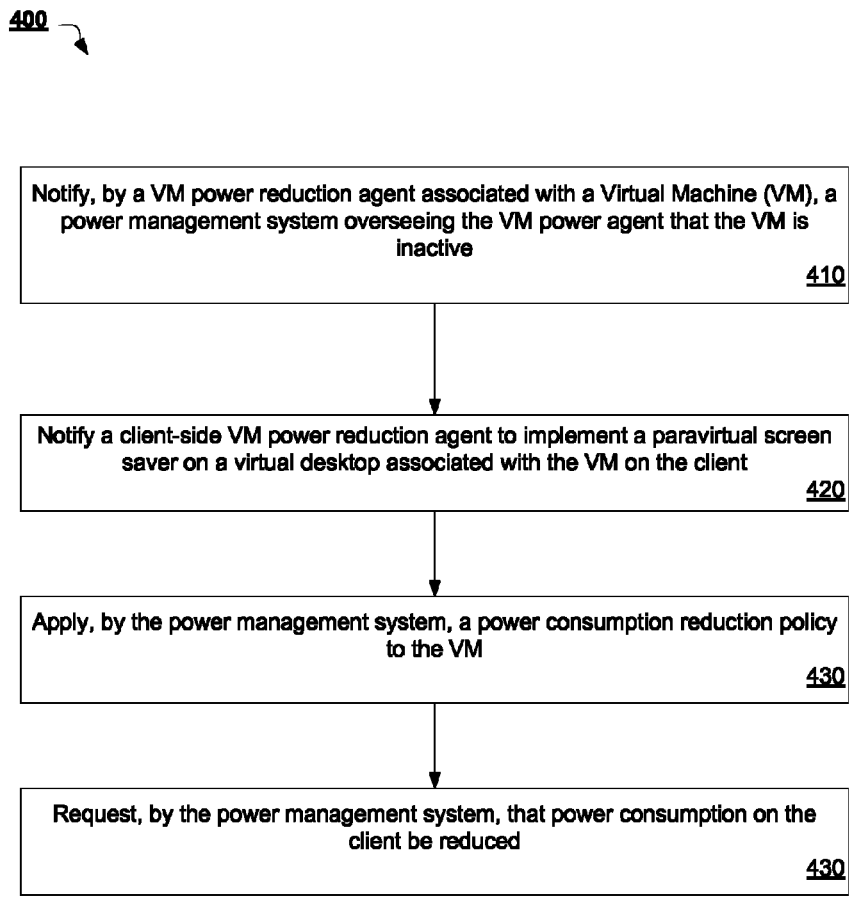
FIG. 4 is a flow diagram illustrating a method for reducing the power consumption of virtual machine servers according to another embodiment of the invention.

FIG. 4 is a flow diagram illustrating another method 400 for reducing the power consumption of virtual machine servers according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by virtualization system 200 of FIG. 2.

Method 400 begins at block 410 where a guest-side VM PRA of a VM notifies a host-side power management system that the VM is inactive. The power management system oversees the VM PRA and may store power reduction settings associated with the VM for the VM PRA. At block 420, the host-side power management system (or alternatively the VM PRA or the host-side power management system agent) notifies a client-side power management agent to implement a screensaver for the VM. This screensaver is run on a display associated with the VM and used by an end user. In this way, embodiments of the invention prevent damage to a display of the client while implementing various power reduction policies for the VM on the host-side. Furthermore, power consumption related to the VM's implemented power reduction policy, such as a screensaver, on the host side can be offloaded to the client side.

At block 430, a power reduction policy is applied to the VM by the power management system. As discussed above, the power reduction policy may consist of one or more of a variety of power-saving policies, including, for example, reducing priority of a VM, swapping the VM with another VM, hibernation, suspension, standby, and shut off. Other power-saving policies may also be implemented and embodiments of the invention are not solely limited to the above-mentioned policies.

Lastly, at block 440, the power management system requests that power consumption on the client be reduced.

Figure 5:
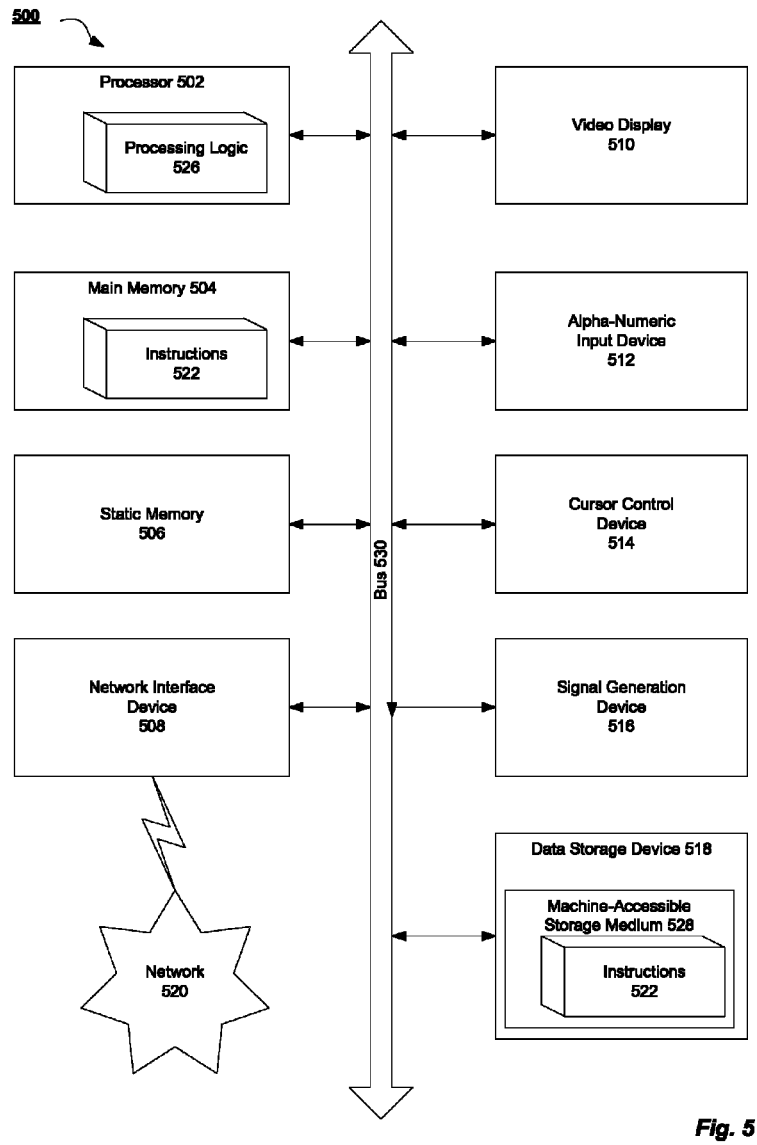
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform power reduction of embodiments of the invention as implemented by virtualization system 100 of FIG. 1 or virtualization system 200 of FIG. 2, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
providing, by a virtual machine (VM) power reduction agent (PRA) of a VM hosted by a host machine, an interface to an end user of the VM for the end user to configure power reduction settings associated with the VM;
monitoring, by the VM PRA, a user activity associated with the VM;
determining, by the VM PRA, that the VM is inactive based on the monitored user activity associated with the VM; and
notifying, by the VM PRA, the host machine that virtualizes resources for the VM that the VM is inactive in order for a power management system agent of the host machine that is associated with the VM PRA to apply a power reduction policy to the VM based on the power reduction settings associated with the VM and configured by the end user.

2. The method of claim 1, wherein the power reduction policy includes at least one of a screensaver, priority reduction, swapping the VM with another VM, hibernation, suspension, standby, and shut off.

3. The method of claim 1, wherein the power management agent of the host machine of the VM applies the power reduction policy to the VM based on the power reduction settings associated with the VM.

4. The method of claim 1, wherein the power management agent of the host machine of the VM applies another power reduction policy to the VM based on an additional determination of continued inactivity of the VM and the power reduction settings associated with the VM.

5. The method of claim 1, wherein a client-side power management agent works in tandem with the VM PRA to facilitate the application of the power reduction policy to the VM, the client-side power management agent residing on a client remotely coupled with the VM.

6. The method of claim 5, further comprising notifying the client-side power management agent to implement a screensaver on a display associated with the VM.

7. The method of claim 1, wherein an Advanced Configuration and Power Interface (ACPI) mechanism associated with the VM provides an indication to the VM PRA that the VM is inactive.

8. A system, comprising:
a memory;
a processing device communicably coupled to the memory;
a virtual machine (VM) executable from the memory by the processing device;
a power management system communicably coupled to the VM; and
a VM power reduction agent (PRA) communicably coupled with the VM and managed by the power management system, the VM PRA operable to:
provide an interface to an end user of the VM for the end user to configure power reduction settings associated with the VM;
monitor a user activity associated with the VM;
determine that the VM is inactive based on the monitored user activity associated with the VM; and
notify the power management system that the VM is inactive;
wherein when the notification that the VM is inactive is received at the host machine, a power management system agent of the host machine that is associated with the VM PRA applies a power reduction policy to the VM based on the power reduction settings associated with the VM and configured by the end user.

9. The system of claim 8, wherein the power reduction policy includes at least one of a screensaver, priority reduction, swapping the VM with another VM, hibernation, suspension, standby, and shut off.

10. The system of claim 8, wherein the power management system is coupled to the VM via a power management system agent, the power management system agent further communicating with the VM PRA.

11. The system of claim 8, further comprising a client-side power management agent communicably coupled to the VM PRA to facilitate the application of the power reduction policy to the VM, the client-side power management agent residing on a client remotely coupled with the VM.

12. The system of claim 11, wherein the power management system is further to notify the client-side power management agent to implement a screensaver on a display associated with the VM.

13. The system of claim 8, wherein an Advanced Configuration and Power Interface (ACPI) mechanism associated with the VM provides an indication to the VM PRA that the VM is inactive.

14. A non-transitory machine-readable storage medium including data that, when accessed by a machine, cause the machine to perform operations comprising:
providing, by a virtual machine (VM) power reduction agent (PRA) of a VM hosted by a host machine, an interface to an end user of the VM for the end user to configure power reduction settings associated with the VM;
monitoring, by the VM PRA, a user activity associated with the VM;
determining, by the VM PRA, that the VM is inactive based on the monitored user activity associated with the VM; and
notifying, by the VM PRA, the host machine that virtualizes resources for the VM that the VM is inactive;
wherein when the notification that the VM is inactive is received at the host machine, a power management system agent of the host machine that is associated with the VM PRA applies a power reduction policy to the VM based on the power reduction settings associated with the VM and configured by the end user.

15. The non-transitory machine-readable storage medium of claim 14, wherein the power reduction policy includes at least one of a screensaver, priority reduction, swapping the VM with another VM, hibernation, suspension, standby, and shut off.

16. The non-transitory machine-readable storage medium of claim 14, wherein the power management agent of the host machine of the VM applies the power reduction policy to the VM based on the power reduction settings associated with the VM.

17. The non-transitory machine-readable storage medium of claim 14, wherein a client-side power management agent works in tandem with the VM power agent to apply the power reduction policy to the VM, the client-side power management agent residing on a client remotely coupled with the VM.

18. The non-transitory machine-readable storage medium of claim 17, wherein the machine-readable storage medium further includes data that, when accessed by a machine, cause the machine to perform operations further comprising notifying the client-side power management agent to implement a screensaver on a display associated with the VM.

19. The non-transitory machine-readable storage medium of claim 14, wherein the power management agent of the host machine of the VM applies another power reduction policy to the VM based on an additional determination of continued inactivity of the VM and the power reduction settings associated with the VM.

20. The non-transitory machine-readable storage medium of claim 14, wherein an Advanced Configuration and Power Interface (ACPI) mechanism associated with the VM provides an indication to the VM PRA that the VM is inactive.

* * * * *